(12) United States Patent
Uchida et al.

(10) Patent No.: US 9,493,854 B2
(45) Date of Patent: Nov. 15, 2016

(54) CONVERTER STEELMAKING METHOD

(71) Applicant: JFE Steel Corporation, Tokyo (JP)

(72) Inventors: Yuichi Uchida, Tokyo (JP); Yuma Igarashi, Tokyo (JP); Hidemitsu Negishi, Tokyo (JP); Naotaka Sasaki, Tokyo (JP)

(73) Assignee: JFE Steel Corporation (JP)

(*) Notice: Subject to any disclaimer, the term of this patent is extended or adjusted under 35 U.S.C. 154(b) by 0 days.

(21) Appl. No.: 14/365,759

(22) PCT Filed: Dec. 19, 2012

(86) PCT No.: PCT/JP2012/082905
§ 371 (c)(1),
(2) Date: Jun. 16, 2014

(87) PCT Pub. No.: WO2013/094634
PCT Pub. Date: Jun. 27, 2013

(65) Prior Publication Data
US 2014/0311295 A1    Oct. 23, 2014

(30) Foreign Application Priority Data

Dec. 20, 2011 (JP) .................................. 2011-278224

(51) Int. Cl.
*C21C 1/02* (2006.01)
*C21C 5/32* (2006.01)
(Continued)

(52) U.S. Cl.
CPC ................. *C21C 1/02* (2013.01); *C21C 1/025* (2013.01); *C21C 5/32* (2013.01); *C21C 5/4606* (2013.01); *C21C 7/068* (2013.01); *C21C 7/0645* (2013.01); *C21C 7/072* (2013.01); *Y02P 10/216* (2015.11)

(58) Field of Classification Search
CPC ........... C21C 1/02; C21C 1/025; C21C 5/32; C21C 5/4606; C21C 7/0068; C21C 7/072
See application file for complete search history.

(56) References Cited

U.S. PATENT DOCUMENTS 6,793,710 B2    9/2004  Sumi et al.
2003/0010155 A1*  1/2003  Sumi et al. ................. 75/553

FOREIGN PATENT DOCUMENTS

EP    1 457 574    9/2004
GB    2 121 936    1/1984
(Continued)

OTHER PUBLICATIONS

Japanese Patent 11-092815 A published Apr. 6, 1999. Machine translation of the description.*
(Continued)

*Primary Examiner* — George Wyszomierski
*Assistant Examiner* — Tima M McGuthry Banks
(74) *Attorney, Agent, or Firm* — DLA Piper LLP (US)

(57) ABSTRACT

A method of producing molten steel supplies gaseous oxygen from a top blowing lance into a converter to perform decarburization refining of molten iron while adding a CaO-containing powdery dephosphorizing agent to simultaneously decarburize and dephosphorize the molten iron and includes supplying the dephosphorizing agent to a bath surface of the molten iron together with at least one gas jet from the top blowing lance and a dynamic pressure determined when a gas jet blown from respective lance nozzles of the top blowing lance impinges onto the bath surface of the molten iron is controlled to not more than 0.50 kgf/cm$^2$.

3 Claims, 2 Drawing Sheets

(51) Int. Cl.
*C21C 5/46* (2006.01)
*C21C 7/068* (2006.01)
*C21C 7/072* (2006.01)
*C21C 7/064* (2006.01)

(56) References Cited

FOREIGN PATENT DOCUMENTS

| JP | 11-092814 | | 4/1999 |
|---|---|---|---|
| JP | 11-092815 | A | 4/1999 |
| JP | 2002-105526 | A | 4/2002 |
| JP | 2002-256318 | A | 9/2002 |
| JP | 3402133 | B2 | 4/2003 |
| JP | 2006-274349 | A | 10/2006 |
| JP | 2006-336033 | A | 12/2006 |
| JP | 2006-342370 | A | 12/2006 |
| JP | 2010-095786 | A | 4/2010 |
| JP | 2011-106028 | A | 6/2011 |
| JP | 2013-133520 | A * | 7/2013 |

OTHER PUBLICATIONS

Japanese Patent 2010-095786 A published Apr. 30, 2010. Machine translation of the description.*
Igarashi et al. Machine translation of JP 2013-133520 A. Published Jul. 2013.*
First Notification of Office Action of corresponding Chinese Application No. 201280056824.x dated Apr. 3, 2015 with English translation.
Supplementary European Search Report dated Feb. 13, 2015 of corresponding European Application No. 12859763.0.
R. Sambasivam, et al., "A New Lance Design for BOF Steelmaking", *Metallurgical and Materials Transactions B*, vol. 38B, No. 1, Feb. 2, 2007, p. 45-53.
Supplemental European Search Report dated Jul. 30, 2015 of corresponding European Application No. 12859763.0.

* cited by examiner

CONVERTER STEELMAKING METHOD

TECHNICAL FIELD

This disclosure relates to a converter steelmaking method of producing molten steel from molten iron, and more particularly to a converter steelmaking method wherein dephosphorization refining simultaneously performed with decarburization refining in a converter can be performed efficiently without using a $CaF_2$-based flux as a slag-forming accelerator for a CaO-containing dephosphorizing agent.

BACKGROUND

In the common converter steelmaking method, dephosphorization refining and decarburization refining of molten iron are simultaneously performed in a single converter to terminate the steelmaking operation. In a recent steelmaking method, however, required quality of steel products has become higher, and a continuous casting or a secondary refining of molten steel in a vacuum degassing furnace, a ladle refining furnace or the like has become widely used. Therefore, a tapping temperature in the converter is raised to decrease dephosphorization ability in the converter.

So, there has been developed a molten iron pretreatment method in which molten iron to be charged in a converter is preliminarily subjected to dephosphorization to remove phosphorous in the molten iron and then charged into the converter. Since removal of phosphorus is efficient in dephosphorization at a molten iron stage of a low temperature level, it is advantageous to perform a method of preliminarily removing phosphorus at a molten iron pretreatment step. For example, as a refining method for molten iron pretreatment, there are a torpedo car system, a ladle system, a converter type system different from a converter for decarburization refining and so on. They are methods of co-using addition of quicklime, iron oxide or the like from above or by an injection method and agitation by blowing of stirring gas or blowing of oxygen gas. In the dephosphorization refining being oxidation refining, since silicon has a stronger affinity for oxygen as compared to phosphorus, silicon in the molten iron is previously removed by oxidation.

Heretofore, the efficiency of the converter and improvement in productivity are attained by performing desiliconization and dephosphorization refining at the molten iron stage and mainly performing decarburization refining in the converter. In such a conventional technique, however, a relatively low phosphorus level can be achieved, but potential heat of the molten iron cannot be utilized effectively due to a long treating time, a large heat loss during treatment, a long time required for supplying to the converter, an inevitable temperature decrease in the tapping of molten iron or recharging into another converter after the treatment even in the use of two converters and so on. Also, there are problems that when the molten iron is preliminarily treated for dephosphorization, a thermal margin in the steelmaking step is decreased and flexibility of materials used is lost and recycling use amount of iron scraps charged into the converter is limited.

Therefore, there has been proposed a refining method in which the dephosphorization refining and decarburization refining of the molten iron are performed simultaneously in the single converter. For example, JP-A-2006-274349 proposes a method wherein calcium oxide containing powder is blown onto a melt surface together with oxygen gas to refine in an oxygen top blowing converter, while agitation is conducted by blowing gas from a nozzle arranged under the melt surface, during which ladle slag including aluminum oxide or a composition including aluminum oxide are added into the furnace to realize reliable molten slag formation through blowing of quicklime powder into the converter to thereby perform accurate refining to decrease an amount of slag generation.

However, the technique disclosed in JP '349 has a problem that if the blowing control is not adequate, a part of quicklime blown into the converter does not stay in the converter due to scattering and efficiency is deteriorated.

In recent steelmaking techniques, it is essential to decrease the discharge amount of slag generated during steelmaking in correspondence with environmental impact as typified by global warming. To decrease the slag discharge amount in the dephosphorization of molten iron, it is necessary to decrease a charging amount of a dephosphorizing agent forming a slag served as the dephosphorization refining agent (hereinafter referred to as "slag for dephosphorization refining"). The essential component of the dephosphorizing agent in the dephosphorization refining of molten iron is lime (CaO). Therefore, to decrease the slag discharge amount, it is required to use a technique of maintaining a necessary dephosphorization amount while decreasing an amount of lime used, i.e., a technique of efficiently performing the dephosphorization refining at a small amount of lime used.

It could, therefore, be helpful to provide a converter steelmaking method capable of efficiently performing dephosphorization refining when molten steel is produced by simultaneously performing decarburization refining and dephosphorization refining of molten iron in a converter.

SUMMARY

Our method is a converter steelmaking method of producing molten steel by supplying gaseous oxygen from a top blowing lance into a converter to perform decarburization refining of molten iron while adding a CaO-containing powdery dephosphorizing agent to simultaneously decarburize and dephosphorize the molten iron, characterized in that the dephosphorizing agent is supplied to a bath surface of the molten iron together with at least one gas jet from the top blowing lance and a dynamic pressure calculated from the following Formulae (1)-(4) when a gas jet blown from respective lance nozzles of the top blowing lance is impinging onto the bath surface of the molten iron is controlled to not more than 0.50 $kgf/cm^2$:

$$P = 3.13 \times 10^{-11} \times \rho g \times (U_0 \times de \times P_0/Lh)^2 \quad (1)$$

$$U_0 = 740(1-(1.033/P_0)^{2/7})^{1/2} \quad (2)$$

$$P_0 = Fj/(0.456 \times dt^2) \quad (3)$$

$$Pg = \rho j + Vp/(Fj/60) \quad (4),$$

wherein
 P: dynamic pressure at a center of the jet exerted on the bath surface of the molten iron by the gas jet blown from the lance nozzle [$kgf/cm^2$]
 ρg: density of the gas jet [$kg/Nm^3$]
 $U_0$: velocity of the gas jet brown from the lance nozzle [m/sec]
 de: outlet diameter of the lance nozzle [mm]
 $P_0$: pressure at nozzle inlet of the gas blown from the lance nozzle [$kfg/cm^2$]
 Lh: lance height [m]

Fj: supply rate of the gas blown from the lance nozzle [Nm³/hr]

dt: throat diameter of the lance nozzle [mm]

ρj: density of the gas blown from the lance nozzle [kg/Nm³]

Vp: supply rate of the powdery dephosphorizing agent [kg/min].

In the above converter steelmaking method, the dephosphorizing agent and the gaseous oxygen are joined together in the same lance and then the dephosphorizing agent is supplied to the bath surface of the molten iron together with the gas jet including the gaseous oxygen.

In the above converter steelmaking method, individual supplying lines of the gaseous oxygen and the dephosphorizing agent associated with a carrier gas are arranged in the same lance and the gaseous oxygen and the carrier gas carrying the dephosphorizing agent are blown toward the bath surface of the molten iron as the gas jets through respective nozzles of the lance.

In the above converter steelmaking method, a dynamic pressure calculated from the above Formulae (1)-(4) when the gas jet including the gaseous oxygen or the gas jet accompanied by the dephosphorizing agent, which is blown from respective lance nozzles of the top blowing lance, is impinging onto the bath surface of the molten iron is controlled to not more than 0.30 kgf/cm², and/or a dynamic pressure calculated from the above Formulae (1)-(4) when the gas jet including the gaseous oxygen or the oxygen gas jet accompanied by the dephosphorizing agent, which is blown from respective lance nozzles of the top blowing lance, is impinging onto the bath surface of the molten iron is controlled to not less than 0.10 kgf/cm².

In the above converter steelmaking method, the dephosphorizing agent is one or more selected from quicklime, hydrated lime, calcium carbonate, converter slag and ladle slag, each having a particle size of not more than 1 mm.

In the converter steelmaking method of producing molten steel by supplying gaseous oxygen to the converter to perform decarburization refining of the molten iron while adding the CaO-containing powdery dephosphorizing agent to form slag to thereby perform simultaneous decarburization and dephosphorization of the molten iron, the powdery dephosphorizing agent is supplied to the bath surface of the molten iron together with the gas jet so that melting of the dephosphorizing agent is expedited to improve dephosphorization ability of the slag. Therefore, even if the amount of the dephosphorizing agent is smaller than the conventional one, the dephosphorization refining can be performed while maintaining a dephosphorization rate equal to or larger than that of the conventional one. Moreover, the dynamic pressure when a gas jet is impinging onto the bath surface of the molten iron is controlled to not more than an adequate value in consideration of an increase of dynamic pressure due to the kinetic energy of the accompanying dephosphorizing agent (quantitative evaluation), excessive scattering of the molten iron and excessive scattering of the dephosphorizing agent outward of the converter can be prevented. As a result, the amount of the slag generated in the converter steelmaking step can be decreased to achieve a significant reduction of environmental load.

Further, the dephosphorization refining can be performed effectively in the production of molten steel by simultaneously performing the decarburization refining and the dephosphorization refining of molten iron, and thus remarkable industrial effects can be achieved.

Figure 1:
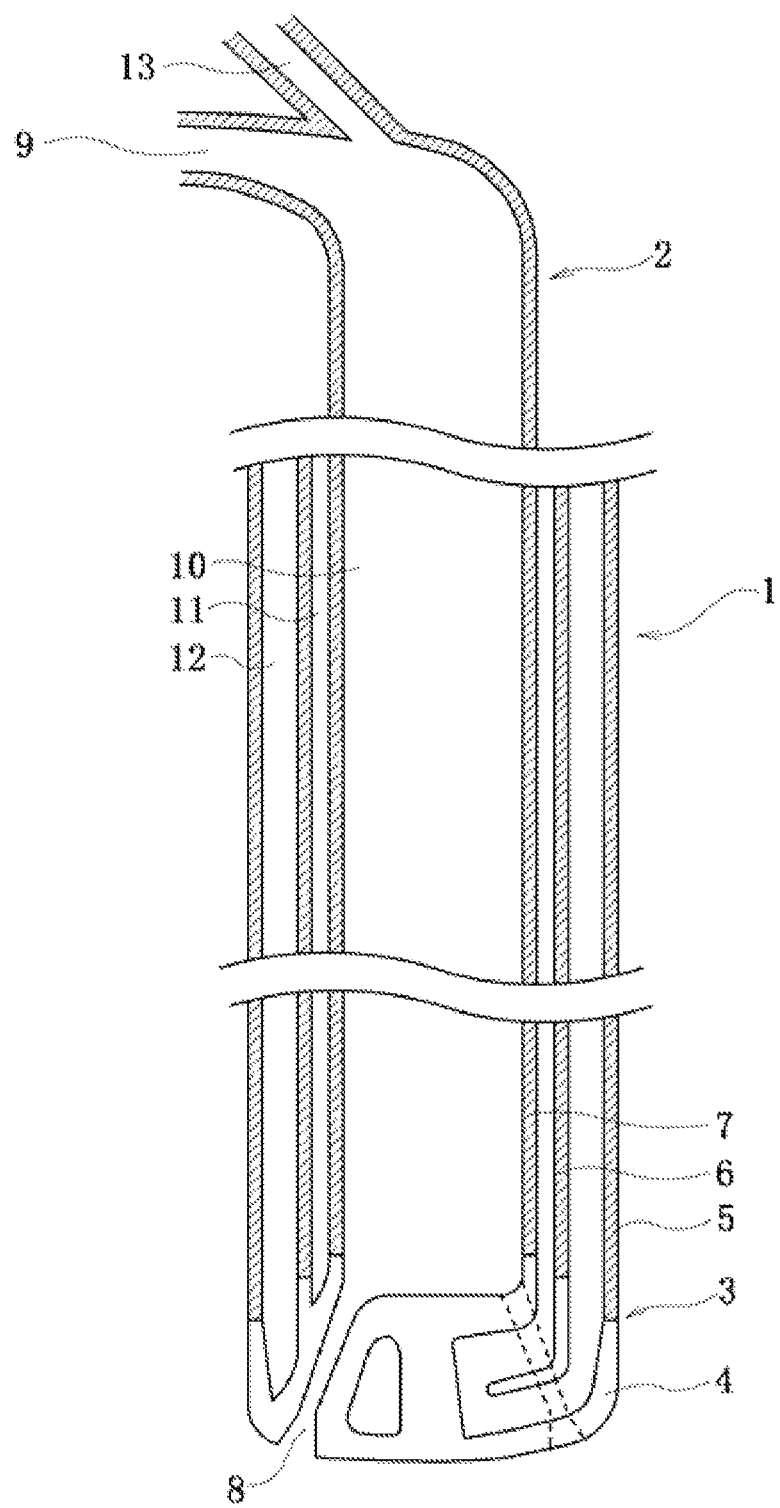
FIG. 1 is a cross-sectional view schematically showing an example of the top blowing lance used in our converter steelmaking method.

DESCRIPTION OF SYMBOLS 1 main body of lance
2 top portion of lance
3 tip portion of lance
4 lance tip made of copper
5 outer pipe
6 middle pipe
7 inner pipe
8 main hole nozzle
9 gaseous oxygen supply pipe
10 gaseous oxygen supply line
11 first coolant water supply/drain line
12 second coolant water supply/drain line
13 powder supply pipe
14 powder supply line
15 powder nozzle

DETAILED DESCRIPTION

Figure 2:
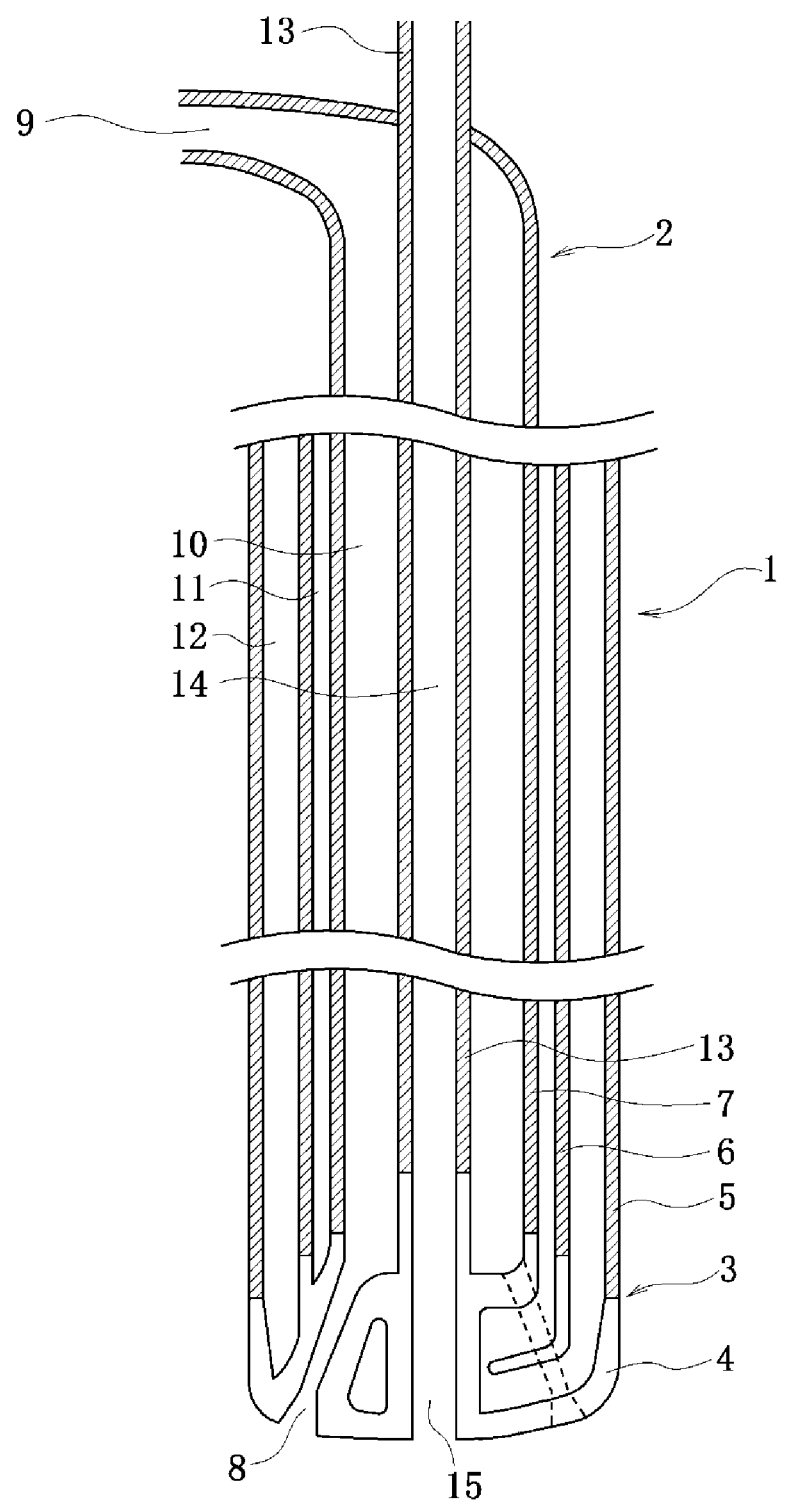
FIG. 2 is a cross-sectional view schematically illustrating another example of the top blowing lance used in our converter steelmaking method.

Each of FIGS. 1 and 2 is a cross-sectional view schematically showing an example of the top blowing lance used in the converter steelmaking method. Since the top blowing lance is normally a long object, it is shown by dividing into a lance main body 1, a lance top portion 2 and a lance tip portion 3 in FIGS. 1 and 2. In the figures, 4 is a copper lance tip, 5 is an outer pipe, 6 is a middle pipe, 7 is an inner pipe, 8 is a main hole nozzle, 9 is a gaseous oxygen supply pipe, 10 is a gaseous oxygen supply line, 11 is a first coolant water supply/drain line, 12 is a second coolant water supply/drain line, 13 is a powder supply pipe, 14 is a powder supply line and 15 is a powder nozzle.

The converter steelmaking method will be described specifically below.

When molten steel is produced with a converter from molten iron not subjected to a preliminary dephosphorization, the molten iron is charged into the converter and a CaO-containing dephosphorizing agent, a gaseous oxygen source such as oxygen gas or the like, and a solid oxygen source such as iron oxide used according to need are supplied thereto, whereby carbon in the molten iron is removed by oxidation with oxygen in the oxygen source, while phosphorus in the molten iron is oxidized with the oxygen source and the resulting phosphorus oxide is incorporated into a slag for dephosphorization refining formed from CaO-containing dephosphorizing agent and the like to thereby remove phosphorous in the molten iron.

Carbon in the molten iron is oxidized and discharged out of the system as CO gas. In this case, the CaO-containing dephosphorizing agent also plays a role of covering a bath surface of the molten iron to prevent generation of iron splash and the like. Refining performed by top-blowing or bottom-blowing the gaseous oxygen source such as oxygen gas or the like into the molten iron is referred to as "oxygen blowing," and the gaseous oxygen source and the solid oxygen source are summarized and referred to as oxygen source.

The dephosphorization refining is performed in the converter so that the pretreatment of the molten iron may be performed according to a sulfur content in a specification of chemical composition for a steel grade to be produced, if necessary, and it is basically unnecessary to perform preliminary dephosphorization and preliminary desiliconization. However, to promote dephosphorization refining in the converter, preliminary desiliconization may be performed. During the oxygen blowing in the converter, silicon in the molten iron is oxidized to $SiO_2$ and transferred to a slag for dephosphorization refining made from the CaO-containing dephosphorizing agent or the like. However, the dephosphorization reaction is promoted as the basicity of the slag for dephosphorization refining (mass % CaO/mass % $SiO_2$) becomes higher so that if the amount of the resulting $SiO_2$ is large, it is necessary to increase the supplying amount of the CaO-containing dephosphorizing agent. In such a case, if the preliminary desiliconization is performed, it is possible to perform an effective dephosphorization refining.

When producing molten steel for steel products having a low phosphorous content, it is possible to reliably produce molten steel having a low phosphorous content by performing the preliminary dephosphorization at the molten iron stage and applying the method during the converter decarburization refining. That is, the preliminary dephosphorization may be performed in the production of molten steel having a low phosphorous content. Mass % CaO and mass % $SiO_2$ in the calculation formula of the basicity indicate CaO concentration and $SiO_2$ concentration in the slag for dephosphorization refining, respectively.

The powdery dephosphorizing agent is supplied to the bath surface of the molten iron together with a gas jet using a lance shown in FIG. 1 or 2. In the bath surface of the molten iron, an impinging site of the gaseous oxygen on the bath surface of the molten iron or a hot spot, where a high oxygen potential field is locally formed with the gaseous oxygen to generate iron oxide, becomes high temperature due to the reaction of the gaseous oxygen with the molten iron or carbon in the molten iron. In the lance of FIG. 1, the powdery dephosphorizing agent is supplied toward the above hot spot together with a jet of the gaseous oxygen. In the lance of FIG. 2, the dephosphorizing agent is supplied toward the bath surface of the molten iron together with a jet of a carrier gas from a powder nozzle. However, both of the jet of the gaseous oxygen and the jet of the carrier gas accompanied by the dephosphorizing agent spread from a central axis of the jet in a radial direction to a certain extent so that the dephosphorizing agent is partially caught in the jet of the gaseous oxygen and supplied to the hot spot. Thus, the dephosphorizing agent is immediately melted to rapidly form a slag most suitable for dephosphorization reaction and, hence, the dephosphorization is promoted even if the slag amount is small or even if the temperature is high.

When the powdery dephosphorizing agent is supplied to the bath surface of the molten iron together with the gas jet, a dynamic pressure of the gas jet impinging onto the bath surface becomes large owing to the addition of kinetic energy of the powder. In general, the dynamic pressure means a pressure generated by a wind pressure or a velocity of the gas jet other than a static pressure thereof. This means a pressure generated by kinetic energy of the gas jet and the powdery dephosphorizing agent accompanying the jet. As the dynamic pressure of the impinging gas jet becomes high, the scattering of the molten iron generated by the jet (spitting) or the scattering of the powdery dephosphorizing agent associated therewith becomes large. Therefore, when the powdery dephosphorizing agent is supplied to the bath surface of the molten iron together with the gas jet, blowing conditions of the gas jet should be adequately controlled. However, since the quantitatively controlling means thereof is not known in conventional operations, there are caused problems that scull is deposited onto a mouth of the converter due to the scattering of the molten iron and the yield of the dephosphorizing agent is deteriorated to cause the poor dephosphorization.

We found that an increase of dynamic pressure due to kinetic energy of the dephosphorizing agent can be evaluated quantitatively and the dynamic pressure can be adequately controlled by calculating the dynamic pressure of the impinging gaseous oxygen onto the bath surface of the molten iron in consideration of a weight of the accompanying dephosphorizing agent.

A pressure (dynamic pressure) P at a center of the jet when the gas jet blown from respective lance nozzles is impinging onto the bath surface of the molten iron can be calculated from the following Formulae (1)-(4):

Formula 1

$$P = 3.13 \times 10^{-11} \times \rho g \times (U_0 \times de \times P_0/Lh)^2 \quad (1)$$

Formula 2

$$U_0 = 740(1-(1.033/P_0)^{2/7})^{1/2} \quad (2)$$

Formula 3

$$P_0 = Fj/(0.456 \times dt^2) \quad (3).$$

In the above formulae,

P: dynamic pressure at a center of the jet exerted on the bath surface of the molten iron by the gas jet blown from the lance nozzle [kgf/cm²]

ρg: density of the gas jet [kg/Nm³]

$U_0$: velocity of the gas jet blown from the lance nozzle [m/sec]

de: outlet diameter of the lance nozzle [mm]

$P_0$: pressure at nozzle inlet of the gas blown from the lance nozzle [kgf/cm²]

Lh: lance height [m]

Fj: supply rate of the gas blown from the lance nozzle [Nm³/hr]

dt: throat diameter of the lance nozzle [mm].

When a flow passage of the gas is branched in the lance as shown in FIGS. 1 and 2, the supply rate of the gas Fj blown from respective lance nozzles cannot be measured directly by a flow measuring device. However, the supply rate is determined accurately if the calculation is performed assuming that a total gas flow rate measured is distributed in proportion to a cross-section area of throat portions of respective lance nozzles. In the case of the gas jet accompanied by the powdery dephosphorizing agent, the dynamic pressure of the gas jet exerted on the bath surface of the molten iron is calculated as follows. That is, the increase of dynamic pressure due to kinetic energy of the dephosphorizing agent can be estimated quantitatively by calculating the density of the gas jet ρg in the Formula (I) as shown in the following formula:

Formula 4

$$\rho g = \rho j + V p/(Fj/60) \quad (4).$$

In the above formula,

ρj: density of the gas blown from the lance nozzle [kg/Nm³]

Vp: supply rate of the powdery dephosphorizing agent [kg/min].

When the Formula (4) is utilized, the dynamic pressure at the bath surface can be calculated by the Formulae (1)-(4)

even if the gas jet is accompanied by the powdery dephosphorizing agent. When the powder and the carrier gas are blown from the nozzle, the actual pressure at nozzle inlet of the gas blown from the lance nozzle is a value higher than the pressure $P_0$ at nozzle inlet of the gas calculated by the Formula (3). However, in the estimation of the dynamic pressure of the gas jet accompanied by the powder, the calculated value by the Formula (3) is used.

As shown in FIG. 1, when the CaO-containing powdery dephosphorizing agent is joined with oxygen gas for refining in the same lance and supplied to the bath surface of the molten iron, a total supply rate of the oxygen gas for refining and the carrier gas is used as the supply rate of the gas (Fj) blown from the lance nozzle, and a weighted average of the gas density of the oxygen gas for refining and that of the carrier gas is used as the density of the gas ($\rho j$) blown from the lance nozzle.

As shown in FIG. 2, when the oxygen gas for refining and the CaO-containing powdery dephosphorizing agent are blown from separate nozzles of the top blowing lance and supplied to the bath surface of the molten iron, the dynamic pressure of the gas jet applied to the bath surface of the molten iron may be calculated by utilizing the Formulae (1)-(4) with respect to both of the gas jet from the nozzle for the oxygen gas for refining and the gas jet from the nozzle for the dephosphorizing agent. Even in this case, a part of the dephosphorizing agent is caught by the gas jet of the gaseous oxygen for refining as mentioned above. In this case, however, kinetic energy is only exchanged mutually so that the influence of the powder on the dynamic pressure of the gas jet applied to the bath surface of the molten iron is small and can be ignored.

As seen from the above Formulae (1)-(3), there are many factors affecting the dynamic pressure, but since there are equipment constraint and operational constraint, all of the factors cannot be changed freely so that it is required to adequately control the dynamic pressure of the jet at the bath surface under the constrained conditions of respective factors. By using the Formulae (1)-(4) to calculate the bath surface dynamic pressure of the gas jet accompanied by the dephosphorizing agent, the dynamic pressure can be controlled through an adequate control of blowing conditions corresponding to an actual operation.

The dynamic pressure P calculated when the jet of the gaseous oxygen accompanied by the powdery dephosphorizing agent is impinging onto the bath surface of the molten iron is preferable to be not more than 0.50 $kgf/cm^2$. If the dynamic pressure P exceeds 0.50 $kgf/cm^2$, the scattering of the molten iron and the dephosphorizing agent associated with an excessive dynamic pressure is caused to decrease the yield of the dephosphorizing agent to thereby lower the efficiency. Also, the slag amount is decreased to cause poor dephosphorization. The dynamic pressure P is more preferably a range of not more than 0.40 $kgf/cm^2$, and further preferably a range of not more than 0.30 $kgf/cm^2$. If the dynamic pressure P is too small, it is difficult to perform the dephosphorization refining so that the dynamic pressure P is preferable to be not less than 0.10 $kgf/cm^2$.

As the gaseous oxygen can be used oxygen gas (including industrial pure oxygen), air, oxygen-enriched air, a mixed gas of oxygen gas and inert gas, and so on. In the common converter refining, the use of oxygen gas is preferable because the decarburization reaction rate and dephosphorization reaction rate are fast as compared with the use of other gases. In the case of the mixed gas, it is preferable to make an oxygen concentration higher than that of air to ensure the decarburization reaction rate and dephosphorization reaction rate.

The CaO-containing dephosphorizing agent is supplied together with the gaseous oxygen to the bath surface of the molten iron including the site where the gaseous oxygen is supplied. Thus, the CaO-containing dephosphorizing agent itself is also heated under a higher temperature atmosphere so that the slag formation can progress more rapidly. That is, the dephosphorization reaction can be further more promoted. The particle size of the CaO-containing dephosphorizing agent supplied together with the gaseous oxygen is preferable to be not more than 1 mm as a particle diameter from a viewpoint of promoting slag formation. It is a matter of course that a part of the CaO-containing dephosphorizing agent may be charged through a hopper or the like separately from the gaseous oxygen.

As long as the CaO-containing dephosphorizing agent contains CaO and can perform the dephosphorization refining, the CaO content is not specifically limited. Typically, it is made of CaO alone or contains not less than 50 mass % of CaO and may contain other components, if necessary.

As the other components may be generally mentioned a fluxing agent. Our technique enables us to reduce or omit the fluxing agent, but does not prohibit addition of the fluxing agent to further improve slag formation efficiency. As the fluxing agent is particularly mentioned titanium oxide having a function of lowering the melting point of CaO to promote slag formation, or a material containing aluminum oxide ($Al_2O_3$). Among them, it is preferable to add titanium oxide from a viewpoint of slag viscosity.

Also, a $CaF_2$-based flux such as fluorite or the like may be used as the fluxing agent. However, it is preferable that the $CaF_2$-based flux is not used as the fluxing agent from a viewpoint of environmental protection by suppressing elution amount of fluorine from the slag in disposing or the like of the slag. It is no problem to use a material in which fluorine is inevitably incorporated as an impurity. Even if a material containing titanium oxide or a material containing aluminum oxide is used as the fluxing agent, it is preferable that such a material does not contain fluorine from the above viewpoint.

As the CaO-containing dephosphorizing agent are preferable quicklime and limestone because they are inexpensive and excellent in the dephosphorization efficiency. Also, a calcined dolomite may be used as the CaO-containing dephosphorizing agent.

As the solid oxygen source may be used sintered iron ore, mill scale, dust (collecting dust), iron sand, iron ore and the like. The collecting dust means an iron-containing dust recovered from an exhaust gas during blast furnace process, converter process and sintering process.

The gaseous oxygen as an oxygen source may be supplied from a top blowing lance. To supply the CaO-containing dephosphorizing agent to the bath surface of the molten iron together with the gaseous oxygen, the dephosphorizing agent is transferred, for example, to an inlet of the top blowing lance with a carrier gas and joined with the gaseous oxygen in the same top blowing lance and then supplied from the main hole nozzle 8 as shown in FIG. 1, whereby the aforementioned supplying conditions can be achieved.

Moreover, at least two supply lines are disposed in the top blowing lance, whereby the gaseous oxygen source can be supplied from one supply line and the CaO-containing dephosphorizing agent can be supplied together with the carrier gas from another supply line. As shown in FIG. 2, respective supply lines for the gaseous oxygen and the CaO-containing dephosphorizing agent powder (gaseous oxygen supply line 10 and powder supply line 14) are arranged in the same top blowing lance, and the gaseous oxygen and the powdery dephosphorizing agent accompanying the carrier gas are supplied to the bath surface of the molten iron from separate nozzles of the lance. As the carrier gas may be used oxygen gas, air, carbon dioxide gas, non-oxidizing gas, noble gas, reducing gas and the like alone or in admixture. Generally, the flow rate of the carrier gas for the dephosphorizing agent is lower by one order as compared with the flow rate of the gaseous oxygen for the oxygen blowing. Even in this case, the adjustment of the dynamic pressure can be performed by calculating the dynamic pressure with the Formulae (1)-(4).

As the construction having two supply lines as shown in FIG. 2 can be adopted, for example, a construction wherein the top blowing lance has at least a double pipe structure, and one pipe is a gaseous oxygen supply pipe 9 being a flow passage of the gaseous oxygen and the other pipe is a powder supply pipe 13 being a flow passage of the dephosphorizing agent and the carrier gas and the gaseous oxygen is supplied from the main hole nozzle 8 arranged on a concentric circle centering a central axis of the lance and the dephosphorizing agent and the carrier gas are supplied from the powder supply nozzle 15 arranged on the central axis of the lance.

Also, plural main hole nozzles 8 and plural powder nozzles 15 can be arranged on a concentric circle centering the central axis of the lance, and the gaseous oxygen and the dephosphorizing agent with the carrier gas are supplied from alternate (staggered) nozzle holes. Further, at least three supply lines can be disposed in the top blowing lance wherein the gaseous oxygen is supplied from one supply line, and the CaO-containing dephosphorizing agent is supplied from another supply line together with the carrier gas and joined in the same top blowing lance and blown from the lance nozzle, and the solid oxygen source is supplied from another supply line together with the carrier gas and blown from another lance nozzle. Even in this case, the adjustment of the dynamic pressure can be performed by calculating the dynamic pressure with the Formulae (1)-(4) in addition to the supply rate of the solid oxygen source and the supply rate of the dephosphorizing agent. These examples of the lance can be selected depending on the object of the refining operation and the flexibility of the lance design.

When gaseous oxygen is used, its oxidation reaction heat raises the temperature of the molten iron. However, when the solid oxygen source is used, the temperature of the molten iron drops because sensible heat, latent heat and decomposition heat of the solid oxygen source itself are larger than the oxidation reaction heat. The usage ratio of the gaseous oxygen and the solid oxygen source is determined depending on the temperature of the molten iron before converter refining and a target temperature of the resulting molten steel. To perform the dephosphorization reaction effectively, it is preferable to agitate the molten iron. As to this agitation, gas agitation may be generally performed by utilizing tuyeres embedded in the furnace bottom and the like.

As the slag for the dephosphorization refining, it is preferable to use a slag having FeO concentration of not less than 10 mass % but not more than 50 mass %. Therefore, to maintain the FeO concentration in the slag within the above range, it is preferable to control the supply rate of the oxygen source (gaseous oxygen and solid oxygen source). A more preferable range of FeO concentration is not less than 10 mass % but not more than 30 mass %.

When the converter refining is performed to the molten iron as mentioned above, even if the amount of the dephosphorizing agent used is small compared to the conventional one, the dephosphorization refining is attained while maintaining the dephosphorization rate equal to the conventional one. As a result, the amount of slag generated in the converter steelmaking step can be reduced, and remarkable reduction of environmental load is attained. Moreover, the effect of reducing the dephosphorizing agent is widely applicable to the converter steelmaking in principle. For example, the above effect is obviously developed in the decarburization blowing of the molten iron subjected to the preliminary dephosphorization.

EXAMPLES

Example 1

Molten iron of 280 tons tapped from a blast furnace is charged into a converter previously charged with 50 tons of iron scrap, and decarburization blowing is performed 5 times in total in the converter (Invention Examples 1-5). The carbon concentration, silicon concentration and phosphorus concentration of the molten iron before the decarburization blowing are 4.3 mass %, 0.25 mass % and 0.12 mass %, respectively, and the temperature of the molten iron is about 1300° C. The carbon concentration and phosphorus concentration of the molten iron after the decarburization blowing are targeted to 0.03 mass % and 0.025 mass %, respectively, and the temperature of the molten iron after the decarburization blowing is targeted to 1670° C.

The decarburization blowing is performed by using a top blowing lance having two supply pipes 9 and 13 in addition to supply/drain lines 11 and 12 of coolant water as shown in FIG. 1. That is, a gaseous oxygen is supplied from a gaseous oxygen supply pipe 9, and quicklime powder (average particle diameter: not more than 1 mm) as a powdery dephosphorizing agent is supplied from a powder supply pipe 13 together with oxygen gas as a carrier gas, and both of them are joined at a top portion of the lance and fed from a main hole nozzle 8. In the main hole nozzle 8, a throat diameter is 55 mm, and an outlet diameter is 65 mm. Four main hole nozzles are disposed on a concentric circle centering a central axis of the lance. A flow rate of top blown oxygen including the carrier gas is made constant at 44000 Nm$^3$/hr, and an oxygen unit consumption is about 45 Nm$^3$/t except the oxygen required for desiliconization. Moreover, Ar gas as an agitating gas is blown from tuyeres at the bottom of the converter in a flow amount of 0.03-0.30 Nm$^3$/min per 1 ton of molten iron.

A supply rate of the quicklime powder is 500 kg/min.

As a CaO-containing dephosphorizing agent other than the above powder to form a slag for refining are used granular quicklime (average particle diameter: about 20 mm) and dolomite (average particle diameter: about 20 mm, CaO content: 40 mass %), which are charged into the converter from a hopper arranged above the converter. Moreover, the decarburization blowing is performed without adding a fluorine-containing material such as fluorite or the like.

As a comparative example, the decarburization blowing is performed by charging only granular quicklime from the hopper arranged above the converter without charging the powdery quicklime from the lance (Comparative Example 1). The other decarburization blowing conditions of the comparative example are same as those of Invention Example 1. When the distance from a tip of the lance to the bath surface (hereinafter referred to as lance height) in this case is set as standard, the lance height of Invention Example 1 is same as the standard, and the lance heights of Invention Examples 2, 3 and 4 are 200 mm, 400 mm and 600 mm higher than the standard, respectively. Invention Example 5 has the same lance height as that of Invention Example 2, wherein only the powdery quicklime is charged from the lance without charging lime from the hopper arranged above the converter. In Comparative Example 2, the lance height is 200 mm lower than the standard.

In Invention Examples 1-5, the dynamic pressure at a position where the gas jet from the top blowing lance nozzle is impinging onto the bath surface of the molten iron is controlled to a value shown in Table 1 by quantitatively estimating the increase of dynamic pressure due to kinetic energy of the quicklime powder as the dephosphorizing agent accompanying the jet and adjusting the lance height in accordance with the equipment and operational conditions to be not more than 0.5 kgf/cm² which is an upper limitation value of an appropriate range in the equipment.

In Table 1 are shown operational conditions, CaO yield and phosphorus concentration in molten steel after the decarburization blowing in the Invention Examples and Comparative Examples. In Table 1, CaO unit consumption is shown by an amount per 1 ton of molten iron (kg/ton). The CaO unit consumption is calculated by a sum of an amount of quicklime added and an amount of CaO added in dolomite. The CaO yield is defined by the following formula:

CaO yield (%)=100×[(SiO₂ amount per unit mass of molten iron)/(CaO unit consumption)]÷[(slag % SiO₂)/(slag % CaO)].

Herein, the slag % $SiO_2$ and the slag % CaO in the formula for CaO yield mean $SiO_2$ concentration (mass %) and CaO concentration (mass %) in the slag after the end of refining.

the phosphorus concentration in the molten steel after the decarburization blowing is higher than 0.025 mass %. In Comparative Example 2 wherein the dynamic pressure when the top blowing jet of the gaseous oxygen from the lance is impinging onto the bath surface exceeds 0.50 kgf/cm², there is observed the decrease of CaO yield due to the scattering of the powdery quicklime.

Example 2

A molten iron tapped from a blast furnace is transferred to a converter of 300 tons in capacity and subjected to preliminary dephosphorization in the converter. Thereafter, the molten iron is charged into another converter of 300 tons in capacity and subjected to decarburization blowing in the converter. This refining method is repeatedly performed four times in total (Invention Examples 11-14). The carbon concentration and phosphorus concentration of the molten iron after the preliminary dephosphorization (before the decarburization blowing) are 3.0 mass % and 0.03 mass %, respectively, and the temperature of the molten iron thereof is about 1360° C. The phosphorus concentration of the molten steel after the decarburization blowing is targeted to 0.015 mass % and the carbon concentration and the temperature of the molten steel after the decarburization blowing of the molten steel are targeted to the same as in Example 1.

The decarburization blowing is performed by using a lance having two separated supply lines 10 and 14 in addition to supply/drain lines 11 and 12 of coolant water as shown in FIG. 2, wherein the gaseous oxygen can be supplied from the gaseous oxygen supply line 10 and the powdery quicklime (average particle diameter: not more than 1 mm) can be supplied from the powder supply line 14

TABLE 1

| | CaO unit consumption (kg/t) | Quicklime supplied from top blowing lance (kg/t) | Quicklime supplied from above furnace (kg/t) | Lance height (mm) | Dynamic pressure at bath surface (kgf/cm²) | Phosphorus concentration of molten steel after decarburization (%) | CaO yield (%) |
|---|---|---|---|---|---|---|---|
| Invention Example 1 | 30 | 23 | 7 | 3000 | 0.48 | 0.021 | 91 |
| Invention Example 2 | 30 | 23 | 7 | 3200 | 0.42 | 0.020 | 90 |
| Invention Example 3 | 30 | 23 | 7 | 3400 | 0.37 | 0.021 | 91 |
| Invention Example 4 | 30 | 23 | 7 | 3600 | 0.33 | 0.022 | 95 |
| Invention Example 5 | 23 | 23 | 0 | 3200 | 0.42 | 0.025 | 90 |
| Comparative Example 1 | 30 | 0 | 30 | 3000 | 0.32 | 0.027 | 90 |
| Comparative Example 2 | 30 | 23 | 7 | 2800 | 0.55 | 0.029 | 85 |

As shown in Table 1, in all of our examples wherein the dynamic pressure when the top blowing jet of the gaseous oxygen supplied from the lance is impinging onto the bath surface is set to not more than 0.50 kgf/cm², the phosphorus concentration in the molten steel after the decarburization blowing is not more than 0.025 mass % and the CaO yield is a high value of not less than 90%. In Invention Example 5 can be obtained the molten steel having a target phosphorus concentration at a small lime amount. On the contrary, in Comparative Example 1, since all amount of CaO is charged from above the converter, the slag formation is worse and together with Ar gas as a carrier gas. That is, the structure of the top blowing lance is made to a separated quadruplicate pipe structure of the supply/drain lines 11, 12 of the coolant water, the gaseous oxygen supply line 10 and the supply line of the powdery quicklime (powder supply line 14), wherein the gaseous oxygen is supplied from four main hole nozzles 8 arranged on a concentric circle centering a central axis of the lance, and the powdery quicklime as a dephosphorizing agent and the carrier gas are supplied from a single powder nozzle 15 arranged on the central axis of the lance. The flow rate of the top blowing oxygen, the flow rate of the agitation gas from tuyeres at the bottom of the converter and the supply rate of the quicklime powder are same as in Example 1.

The oxygen unit consumption is about 35 Nm³/ton. All of CaO-containing dephosphorizing agent for forming a slag for dephosphorization refining is the powdery quicklime supplied from the top blowing lance. The decarburization blowing is performed without adding a fluorine-containing material such as fluoride or the like. As a comparative example, the decarburization blowing is performed by charging only granular quicklime from a hopper arranged above the converter without charging the powdery quicklime from the lance (Comparative Example 11). The other decarburization blowing conditions of the comparative example are same as in Invention Example 11. When a nozzle throat diameter of the four nozzles arranged on the concentric circle centering the central axis of the lance in this case is set as standard, the throat diameter of Invention Example 11 is same as the standard, while throat diameters of Invention Examples 12-14 are larger than the standard. The throat diameter of Comparative Example 12 is smaller than the standard. In Invention Example 14, the amount of lime supplied from the lance is decreased. The lance height (2800 mm) and the nozzle outlet diameter (65 mm) are made constant in all of our examples and the comparative examples. Further, the single nozzle arranged on the central axis of the lance is made constant as a throat diameter of 55 mm and an outlet diameter of 55 mm in all of our examples and the comparative examples, and the supply rate of Ar gas is 1800 Nm³/hr. In Invention Examples 11-14, the dynamic pressure at a position where the gas jet from the top blowing lance nozzle is impinging onto the bath surface of the molten iron is controlled to a value shown in Table 2 by quantitatively estimating the increase of dynamic pressure due to kinetic energy of the quicklime powder as the dephosphorizing agent accompanying the jet and adjusting the throat diameter of the each nozzle in accordance with the equipment and operational conditions to be not more than 0.5 kgf/cm² which is an upper limitation value of an appropriate range in the equipment.

In Table 2 are shown operational conditions of our examples and the comparative examples, CaO yield and phosphorus concentration in molten steel after the decarburization blowing.

As shown in Table 2, in all of our examples wherein the dynamic pressure when the top blowing jet of the gaseous oxygen supplied from the lance is impinging onto the bath surface is set to not more than 0.50 kgf/cm², the phosphorus concentration in the molten steel after the decarburization blowing is not more than 0.015 mass % and the CaO yield is a high value of not less than 90%. In Invention Example 14 can be obtained the molten steel having a target phosphorus concentration at a small lime amount. On the contrary, in Comparative Example 11, since all amount of CaO is charged from above the converter, the slag formation is worse and the phosphorus concentration in the molten steel after the decarburization blowing is higher than 0.015 mass %. In Comparative Example 12 wherein the dynamic pressure when the top blowing jet of the gaseous oxygen from the lance is impinging onto the bath surface exceeds 0.50 kgf/cm², there is observed the decrease of CaO yield due to the scattering of the powdery quicklime.

Example 3

A molten iron tapped from a blast furnace is transferred to a converter of 300 tons in capacity and subjected to preliminary dephosphorization in the converter. Thereafter, the molten iron is charged into another converter of 300 tons in capacity and subjected to decarburization blowing in the converter. This refining method is repeatedly performed four times in total (Invention Examples 21-24). The carbon concentration and phosphorus concentration of the molten iron after the preliminary dephosphorization (before the decarburization blowing) are 3.0 mass % and 0.03 mass %, respectively, and the temperature of the molten iron thereof is about 1360° C. The phosphorus concentration of the molten steel after the decarburization blowing is targeted to 0.015 mass % and the carbon concentration and the temperature of the molten steel after the decarburization blowing are targeted to the same as in Example 1.

The decarburization blowing is performed by using a lance having a construction similar to Example 1. In this case, five main hole nozzles 8 are arranged on a concentric circle centering a central axis of the lance, wherein the nozzle has a throat diameter of 66 mm and an outlet diameter of 75 mm. All of CaO-containing dephosphorizing agent for forming a slag for dephosphorization refining is the powdery quicklime supplied from the top blowing lance. The decar-

TABLE 2

| | CaO unit consumption (kg/t) | Quicklime supplied from top blowing lance (kg/t) | Quicklime supplied from above furnace (kg/t) | Nozzle throat diameter (mm) | Dynamic pressure at bath surface | | Phosphorus concentration of molten steel after decarburizetion (%) | CaO yield (%) |
|---|---|---|---|---|---|---|---|---|
| | | | | | Jet from nozzle on concentric circle (kgf/cm²) | Jet from nozzle on center axis (kgf/cm²) | | |
| Invention Example 11 | 15 | 15 | 0 | 55 | 0.37 | 0.013 | 0.013 | 90 |
| Invention Example 12 | 15 | 15 | 0 | 58 | 0.29 | 0.013 | 0.012 | 90 |
| Invention Example 13 | 15 | 15 | 0 | 61 | 0.23 | 0.013 | 0.012 | 95 |
| Invention Example 14 | 12 | 12 | 0 | 61 | 0.23 | 0.013 | 0.015 | 91 |
| Comparative Example 11 | 15 | 0 | 15 | 55 | 0.37 | 0.001 | 0.019 | 90 |
| Comparative Example 12 | 15 | 15 | 0 | 51 | 0.53 | 0.013 | 0.018 | 83 | burization blowing is performed without adding a fluorine-containing material such as fluoride or the like. The flow rate of the top blowing oxygen is constant at 60000 Nm$^3$/hr during a period except a final stage of the decarburization blowing including a period of supplying the powdery quicklime from the top blowing lance. At the final stage of the decarburization blowing, the flow rate of the oxygen is decreased to perform the blowing. The flow rate of the agitation gas from tuyeres at the bottom of the converter and the supply rate of the quicklime powder are same as in Example 1.

As a comparative example, the decarburization blowing is performed by charging only a granular quicklime from a hopper arranged above the converter without charging the powdery quicklime from the lance (Comparative Example 21). The other decarburization blowing conditions of the comparative example are same as in Invention Example 21. When a distance from a tip of the top blowing lance to the bath surface (hereinafter referred to as lance height) in this case is set as standard, the lance height of Invention Example 21 is same as the standard, and the lance heights of Invention Examples 22-24 are 200 mm, 400 mm and 600 mm higher than the standard, respectively. In Comparative Example 22, the lance height is 200 mm lower than the standard. In Invention Examples 21-24, the dynamic pressure at a position where the gas jet from the top blowing lance nozzle is impinging onto the bath surface of the molten iron is controlled to a value shown in Table 3 by quantitatively estimating the increase of dynamic pressure due to kinetic energy of the quicklime powder as the dephosphorizing agent accompanying the jet and adjusting the lance height in accordance with the equipment and operational conditions to be not more than 0.5 kgf/cm$^2$ which is an upper limitation value of an appropriate range in the equipment.

In Table 3 are shown operational conditions and phosphorus concentration after the decarburization blowing and CaO yield in our examples and the comparative examples.

after the decarburization blowing is higher than 0.015 mass %. In Comparative Example 22 wherein the dynamic pressure when the top blowing jet is impinging onto the bath surface exceeds 0.50 kgf/cm$^2$, there is observed the decrease of CaO yield due to the scattering of the powdery quicklime.

Example 4

A molten iron tapped from a blast furnace is desiliconized in a blast furnace runner and subjected to preliminary dephosphorization in a conveying container (torpedo car). Thereafter, the molten iron is transferred to a converter of 300 tons in capacity and subjected to decarburization three times in total in the converter (Invention Examples 31-33). The carbon concentration and phosphorus concentration of the molten iron after the preliminary dephosphorization (before the decarburization blowing) are 3.5 mass % and 0.05 mass %, respectively, and the temperature of the molten iron thereof is about 1300° C. The phosphorous concentration of the molten steel after the decarburization blowing is targeted to 0.020 mass %, and the carbon concentration and the temperature of the molten steel after the decarburization blowing are targeted to the same as in Example 2.

As a bottom blowing gas in the converter, oxygen gas as an agitation gas is blown from an inner pipe of a tuyere having a double pipe structure arranged in the bottom of the converter at a flow rate of about 0.4 Nm$^3$/min per 1 ton of molten iron and a propane gas for cooling the tuyere is blown from an outer pipe to perform the decarburization. In Table 4 are shown components of the molten iron before and after the dephosphorization and operational conditions in our examples.

The decarburization blowing is performed by using the same lance as in Example 2. That is, the structure of the top blowing lance is a separated quadruplicate pipe structure of the supply/drain lines of the coolant water, the supply line of the gaseous oxygen and the supply line of the powdery

TABLE 3

| | CaO unit consumption (kg/t) | Quicklime supplied from top blowing lance (kg/t) | Quicklime supplied from above furnace (kg/t) | Lance height (mm) | Dynamic pressure at bath surface (kgf/cm$^2$) | Phosphorus concentration of molten steel after decarburization (%) | CaO yield (%) |
|---|---|---|---|---|---|---|---|
| Invention Example 21 | 12 | 12 | 0 | 2400 | 0.47 | 0.013 | 91 |
| Invention Example 22 | 12 | 12 | 0 | 2600 | 0.40 | 0.013 | 91 |
| Invention Example 23 | 12 | 12 | 0 | 2800 | 0.34 | 0.012 | 90 |
| Invention Example 24 | 12 | 12 | 0 | 3000 | 0.30 | 0.012 | 91 |
| Comparative Example 21 | 12 | 0 | 12 | 2400 | 0.35 | 0.024 | 90 |
| Comparative Example 22 | 12 | 12 | 0 | 2200 | 0.56 | 0.015 | 82 |

As shown in Table 3, in all of our examples wherein the dynamic pressure when the top blowing jet is impinging onto the bath surface is set to not more than 0.50 kgf/cm$^2$ during a period of supplying powdery quicklime, the phosphorus concentration in the molten steel after the decarburization blowing is not more than 0.015 mass % and the CaO yield is a high value of not less than 90%. On the contrary, in Comparative Example 21, since all amount of CaO is charged from above the converter, the slag formation is worse and the phosphorus concentration in the molten steel quicklime, wherein oxygen gas as a gaseous oxygen source is supplied from four main hole nozzles arranged on a concentric circle centering a central axis of the lance center axis, while the powdery quicklime and oxygen gas as a carrier gas are supplied from a single nozzle arranged on the central axis of the lance. The nozzle arranged on the concentric circle for supplying the gaseous oxygen source has a throat diameter of 68 mm and an outlet diameter of 80 mm.

In Invention Examples 31-33 and Comparative Example 32, all of the CaO-containing dephosphorizing agent for forming a slag for dephosphorization refining is the powdery quicklime supplied from the top blowing lance. The decarburization blowing is performed without adding a fluorine-containing material such as fluoride or the like. The flow rate of the top blown oxygen supplied from the four nozzles arranged on the concentric circle centering the central axis of the lance is constant at 60000 Nm³/hr during a period except an final stage of the decarburization blowing including a period of supplying the powdery quicklime from the top blowing lance. At the final stage of the decarburization blowing, the flow rate of the oxygen is decreased to perform the blowing. The supply rate of the quicklime powder is same as in Example 1.

As a comparative example, the decarburization blowing is performed by charging only a granular quicklime from a hopper arranged above the converter without charging the powdery quicklime from the top blowing lance (Comparative Example 31). The other decarburization blowing conditions of the comparative example are same as in Invention Example 31. When a distance from a tip of the top blowing lance to the bath surface (hereinafter referred to as lance height) in this case is set as standard, the lance height of Invention Example 31 is same as the standard, and the lance heights of Invention Examples 32 and 33 are 200 mm and 400 mm higher than the standard, respectively. In Comparative Example 32, the lance height is 200 mm lower than the standard. The single nozzle arranged on the central axis of the lance is constant in all of our examples and the comparative examples and has a throat diameter of 55 mm and an outlet diameter of 55 mm, and the supply rate of oxygen gas is 1800 Nm³/hr. In Invention Examples 31-33, the dynamic pressure at a position where the gas jet from the top blowing lance nozzle is impinging onto the bath surface of the molten iron is controlled to a value shown in Table 4 by quantitatively estimating the increase of dynamic pressure due to kinetic energy of the quicklime powder as the dephosphorizing agent accompanying the jet and adjusting the lance height in accordance with the equipment and operational conditions to be not more than 0.5 kgf/cm² which is an upper limitation value of an appropriate range in the equipment.

In Table 4 are shown operational conditions and phosphorus concentration after the decarburization blowing and CaO efficiency in our examples and comparative examples.

As shown in Table 4, in all of our examples wherein the dynamic pressure when the gas jet blown from the top blowing lance is impinging onto the bath surface is set to not more than 0.50 kgf/cm², the phosphorus concentration in the molten steel after the decarburization blowing is not more than 0.020 mass % and the CaO yield is a high value of not less than 90%. On the contrary, in Comparative Example 31, since all amount of CaO is charged from above the converter, the slag formation is worse and the phosphorus concentration in the molten steel after the decarburization blowing is higher than 0.020 mass %. In Comparative Example 32 wherein the dynamic pressure when the top blowing jet is impinging onto the bath surface exceeds 0.50 kgf/cm², there is observed the decrease of CaO yield due to the scattering of the powdery quicklime.

The invention claimed is:

1. A converter steelmaking method of producing molten steel by supplying gaseous oxygen from a top blowing lance into a converter to perform decarburization refining of molten iron while adding a CaO-containing powdery dephosphorizing agent to simultaneously decarburize and dephosphorize the molten iron, comprising:
   joining the dephosphorizing agent and the gaseous oxygen together in the same lance;
   supplying the dephosphorizing agent to a bath surface of the molten iron together with at least one gas jet from the top blowing lance; and
   controlling a dynamic pressure determined from formulae (1)-(4) including an increasing amount of dynamic pressure due to a kinetic energy of the dephosphorizing agent when a gas jet including the gaseous oxygen accompanied by the dephosphorizing agent blown from respective lance nozzles of the top blowing lance impinges onto the bath surface of the molten iron to be not less than 0.10 kgf/cm² and not more than 0.50 kgf/cm²:

$$P = 3.13 \times 10^{-11} \times \rho g \times (U_0 \times de \times P_0/Lh)^2 \quad (1)$$

$$U_0 = 740(1-(1.033/P_0)^{2/7})^{1/2} \quad (2)$$

$$P_0 = Fj/(0.456 \times dt^2) \quad (3)$$

$$\rho g = \rho j + Vp/(Fj/60) \quad (4),$$

TABLE 4

| | CaO unit consumption (kg/t) | Quicklime supplied from top blowing lance (kg/t) | Quicklime supplied from above furnace (kg/t) | Lance height (mm) | Dynamic pressure at bath surface | | Phosphorus concentration of molten steel after decarburizetion (%) | CaO yield (%) |
| --- | --- | --- | --- | --- | --- | --- | --- | --- |
| | | | | | Jet from nozzle on concentric circle (kgf/cm²) | Jet from nozzle on center axis (kgf/cm²) | | |
| Invention Example 31 | 15 | 15 | 0 | 3000 | 0.50 | 0.016 | 0.019 | 91 |
| Invention Example 32 | 15 | 15 | 0 | 3200 | 0.44 | 0.014 | 0.018 | 90 |
| Invention Example 33 | 15 | 15 | 0 | 3400 | 0.39 | 0.012 | 0.019 | 95 |
| Comparative Example 31 | 15 | 0 | 15 | 3000 | 0.50 | 0.001 | 0.026 | 90 |
| Comparative Example 32 | 15 | 15 | 0 | 2800 | 0.58 | 0.018 | 0.020 | 83 | wherein
- P: dynamic pressure at a center of the jet exerted on the bath surface of the molten iron by the gas jet blown from the lance nozzle [kgf/cm$^2$]
- ρg: density of the gas jet [kg/Nm$^3$]
- $U_0$: velocity of the gas jet blown from the lance nozzle [m/sec]
- de: outlet diameter of the lance nozzle [mm]
- $P_0$: pressure at nozzle inlet of the gas blown from the lance nozzle [kgf/cm$^2$]
- Lh: lance height [m]
- Fj: supply rate of the gas blown from the lance nozzle [Nm$^3$/hr]
- dt: throat diameter of the lance nozzle [mm]
- ρj: density of the gas blown from the lance nozzle [kg/Nm$^3$]
- Vp: supply rate of the powdery dephosphorizing agent [kg/min].

2. The converter steelmaking method according to claim 1, wherein a dynamic pressure determined from formulae (1)-(4) when the gas jet including the gaseous oxygen accompanied by the dephosphorizing agent, which is blown from respective lance nozzles of the top blowing lance, is impinging onto the bath surface of the molten iron is controlled to not more than 0.30 kgf/cm$^2$.

3. The converter steelmaking method according to claim 1, wherein the dephosphorizing agent is one or more selected from quicklime, hydrated lime, calcium carbonate, converter slag and ladle slag, each having a particle size of not more than 1 mm.

\* \* \* \* \*